(12) United States Patent
Imaizumi et al.

(10) Patent No.: US 8,224,779 B2
(45) Date of Patent: Jul. 17, 2012

(54) DATA MANAGEMENT APPARATUS AND DATA MANAGEMENT SYSTEM

(75) Inventors: Shoji Imaizumi, Shinshiro (JP); Hiroshi Iwamoto, Toyohashi (JP); Masaaki Saka, Toyokawa (JP); Eiichi Yoshida, Toyokawa (JP); Hideki Hino, Toyokawa (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 164 days.

(21) Appl. No.: 11/007,230

(22) Filed: Dec. 9, 2004

(65) Prior Publication Data

US 2006/0053179 A1  Mar. 9, 2006

(30) Foreign Application Priority Data

Sep. 9, 2004  (JP) ................................ 2004-261862

(51) Int. Cl.
G06F 7/00  (2006.01)
G06F 12/00  (2006.01)
G06F 13/00  (2006.01)
G06F 13/28  (2006.01)
G06F 15/16  (2006.01)
G06F 17/00  (2006.01)

(52) U.S. Cl. ........ 707/647; 707/668; 707/694; 709/203; 711/161

(58) Field of Classification Search .................. 707/204; 709/203; 711/161
See application file for complete search history.

(56) References Cited

U.S. PATENT DOCUMENTS

| 5,133,065 | A | * | 7/1992 | Cheffetz et al. ................... 714/2 |
| 5,276,865 | A | * | 1/1994 | Thorpe ............................ 714/24 |
| 5,548,750 | A | * | 8/1996 | Larsson et al. ........................ 1/1 |
| 5,664,186 | A | * | 9/1997 | Bennett et al. ................ 707/204 |
| 5,706,457 | A | * | 1/1998 | Dwyer et al. ................ 715/835 |
| 5,898,824 | A | * | 4/1999 | Kato et al. .................... 358/1.16 |
| 6,304,948 | B1 | * | 10/2001 | Motoyama et al. ........... 711/162 |
| 6,378,070 | B1 | * | 4/2002 | Chan et al. .................... 713/155 |
| 6,636,953 | B2 | * | 10/2003 | Yuasa et al. .................... 711/161 |
| 6,931,422 | B1 | * | 8/2005 | Gusler et al. .......................... 1/1 |
| 2002/0049925 | A1 | * | 4/2002 | Galipeau et al. .................. 714/6 |
| 2003/0028592 | A1 | * | 2/2003 | Ooho et al. .................... 709/203 |
| 2003/0050940 | A1 | * | 3/2003 | Robinson ..................... 707/204 |
| 2004/0073792 | A1 | * | 4/2004 | Noble et al. .................. 713/168 |
| 2004/0174558 | A1 | * | 9/2004 | Mori ............................. 358/1.15 |
| 2008/0177961 | A1 | * | 7/2008 | McSharry et al. ............ 711/162 |

FOREIGN PATENT DOCUMENTS

JP   6-236308   8/1994
(Continued)

OTHER PUBLICATIONS

The National Park Service, "Managing Digital Projects for Preservation and Access", Conserve O Gram, No. 19/22, Sep. 2000.*
Ratner, "Selective Replication: Fine-Grained Control of Replicated Files", Technical Report CSD-950007, UCLA Computer Science Department, 1995.*
(Continued)

*Primary Examiner* — Michael Hicks
(74) *Attorney, Agent, or Firm* — Buchanan Ingersoll & Rooney PC

(57) ABSTRACT

In order to prevent leakage of prescribed information (such as highly confidential information, for example) stored in a data management apparatus via a storage device external to such data management apparatus, when the data management apparatus carries out processing to back up the data stored therein to the external storage device, the data management apparatus prohibits backup of prescribed designated information.

18 Claims, 7 Drawing Sheets

FOREIGN PATENT DOCUMENTS

| | | |
|---|---|---|
| JP | 9-34755 | 2/1997 |
| JP | 11-331454 | 11/1999 |
| JP | 2002-149461 | 5/2002 |
| JP | 2002-288030 | 10/2002 |

OTHER PUBLICATIONS

Notification of Grounds for Rejection dated Sep. 4, 2007, issued in corresponding Japanese Patent Application No. 2004-261862, and translation thereof.

* cited by examiner

DATA MANAGEMENT APPARATUS AND DATA MANAGEMENT SYSTEM

CROSS-REFERENCE TO RELATED APPLICATIONS

This application is based on application No. 2004-261862, filed in Japan, the content of which is hereby incorporated by reference.

BACKGROUND OF THE INVENTION

1. Field of the Invention

The present invention relates to a data management apparatus such as a multifunction peripheral ('MFP') and to a data management system.

2. Description of the Related Art

Some MFPs that have the multiple functions of copying, scanning, facsimile communication and printing also have a function to accumulate various document and other files (i.e., data files) in a storage unit (such as a hard disk) included therein.

The data accumulated in the MFP may be backed up to a prescribed external storage device by the administrator.

Although not a technology for backing up data in an MFP, a technology to back up data on a client (i.e., a terminal) in a client/server system is already in the public domain.

If such a backup technology is applied in connection with an MFP, once data is backed up from the MFP to the external storage device or the like, it is possible for the data files to leak from the storage device in which they are backed up. In other words, even if the data comprises highly confidential information, once it is copied for backup purposes, there is a risk that the information may leak via the external storage device.

OBJECTS AND SUMMARY

An object of the present invention is to provide a data management apparatus and data management system that can prevent prescribed information (e.g., highly confidential information) in the data management apparatus from leaking via a storage device external to the data management apparatus.

In order to attain the object described above, the data management apparatus of the present invention is a data management apparatus capable of performing processing to back up data files in an external storage device, such apparatus including a memory that stores data files and a controller that prohibits backup to the external storage device of those data files among the data files stored in the memory that are designated by the user as prohibited from backup.

According to the present invention, because the data files designated by the user as prohibited from backup are not backed up to the external storage device, the leakage of such data files via the external storage device can be prevented.

The data management apparatus of the present invention is also a data management apparatus capable of performing processing to back up data files to an external storage device, such apparatus including a memory that stores data files, receiving means that receives a backup request indicating that the data files stored in the memory should be backed up, and a controller that, where such backup request is received, prohibits backup to the external storage device of those data files among all the data files stored in the memory that are designated by the user as prohibited from backup.

According to the apparatus of the present invention, because the data files designated by the user as prohibited from backup are not backed up to the external storage device even if a backup request is received from the external device, the leakage of such data files via the external storage device can be prevented.

Yet another invention is a data management system including a first memory that stores data files, a second memory that stores backup data files, and a controller that prohibits backup to the second memory of those data files that are stored in the first memory and are designated by the user as prohibited from backup.

According to the present invention described above, because the data files designated by the user as prohibited from backup are not backed up to the second memory, the leakage of such data files via the second memory can be prevented.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

An embodiment of the present invention is described below with reference to the drawings.

<Overall Construction>

Figure 1:
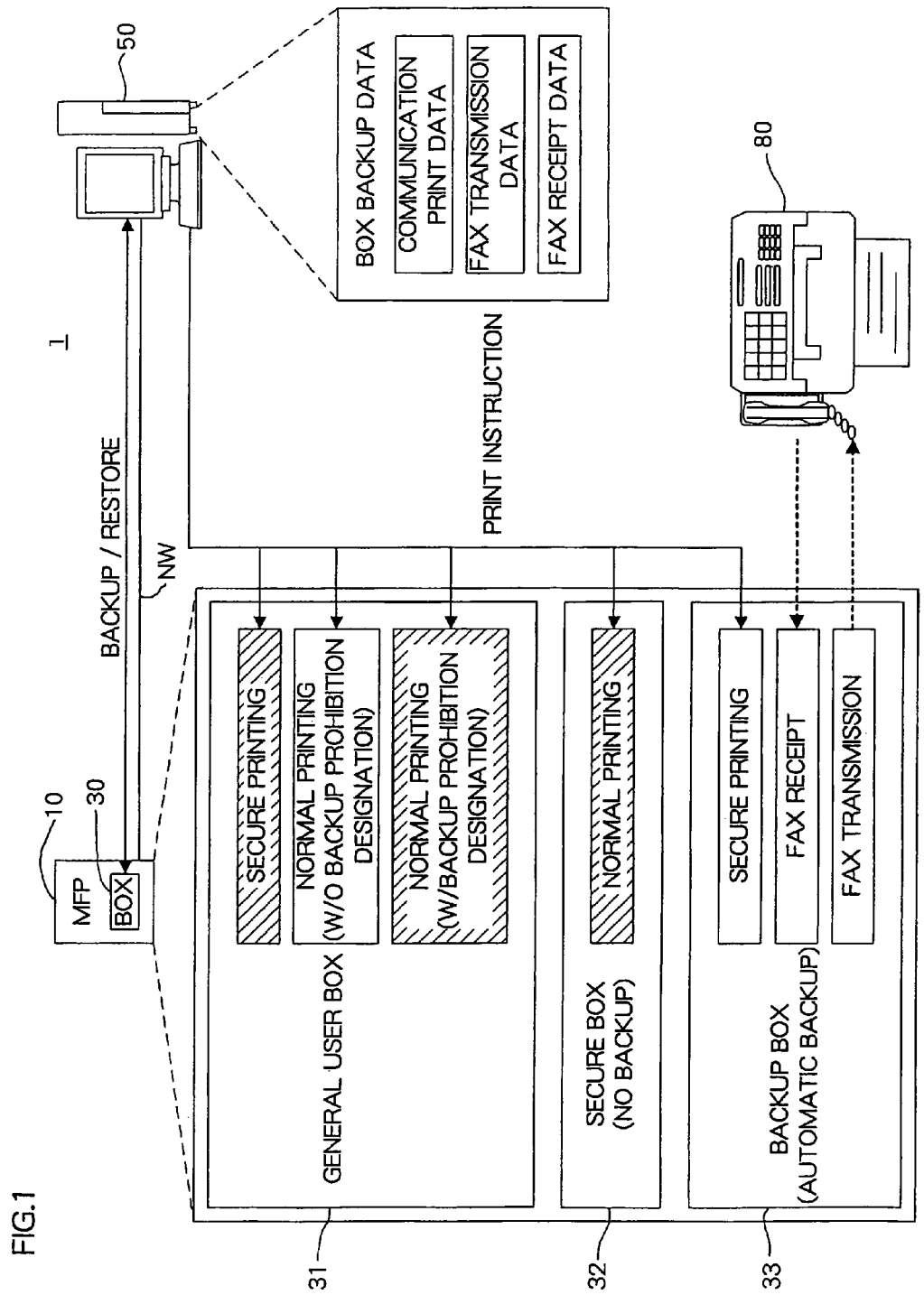
FIG. 1 is a drawing showing the basic construction of a data management system.

FIG. 1 shows in a schematic fashion the overall construction of a data management system 1 pertaining to an embodiment of the present invention. This system 1 includes a multifunction peripheral (hereinafter 'MFP') 10 and a computer 50.

The MFP 10 has the multiple functions of scanning, copying, printing, facsimile communication and image accumulation. Therefore, the MFP 10 is also expressed as an image formation apparatus having an image formation function or an apparatus that manages (or stores) data such as images, i.e., a data management apparatus (or data storage device).

Figure 3:
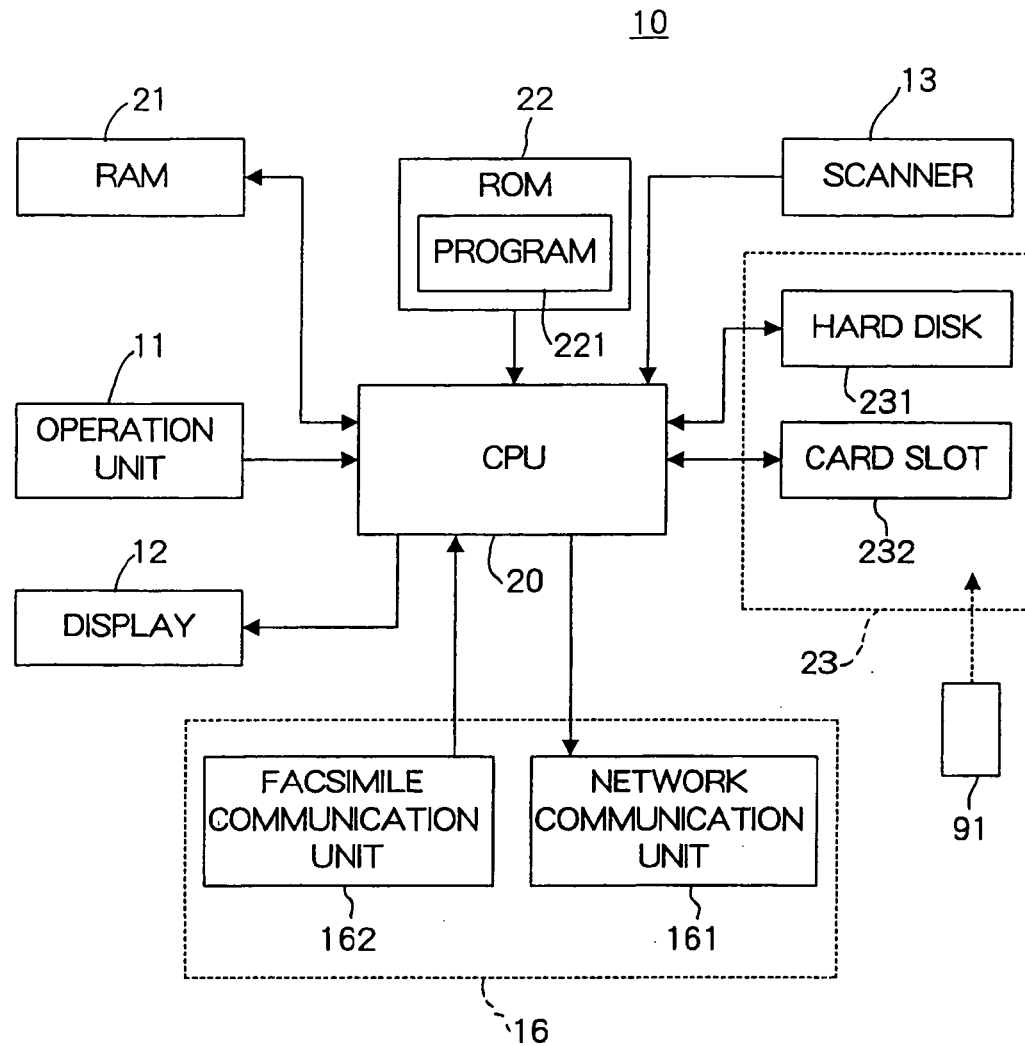
FIG. 3 is a block diagram showing the construction of the MFP.

Data files comprising accumulation targets by the MFP 10's accumulation function are stored in the storage unit 23 inside the MFP 10 (see FIG. 3).

The computer 50 comprises a common personal computer that includes a storage unit such as a hard disk. The computer 50 can back up data stored on the MFP 10 to a storage unit (e.g., a hard disk) on the computer 50 via the transmission and receipt of the data comprising the backup target between the MFP 10 and the computer 50 over a network NW, for example. In other words, the MFP 10 can perform processing to back up onto the computer 50 the data stored on the MFP 10 by forwarding it to the computer 50 (i.e., via a backup routine). The computer 50 is also expressed as a storage device installed externally on the MFP 10 (i.e., an external storage device).

As described below, during this backup routine, those data files among the data files stored on the MFP 10 that are designated by the user as prohibited from backup are excluded as external storage device backup targets. In other words, data files designated by the user as data files prohibited from backup are prohibited from being backed up in the external storage device. Therefore, leakage of those data files designated as backup prohibition targets via the computer (external storage device) 50 can be prevented.

<Detailed Construction of the MFP 10>

Figure 2:
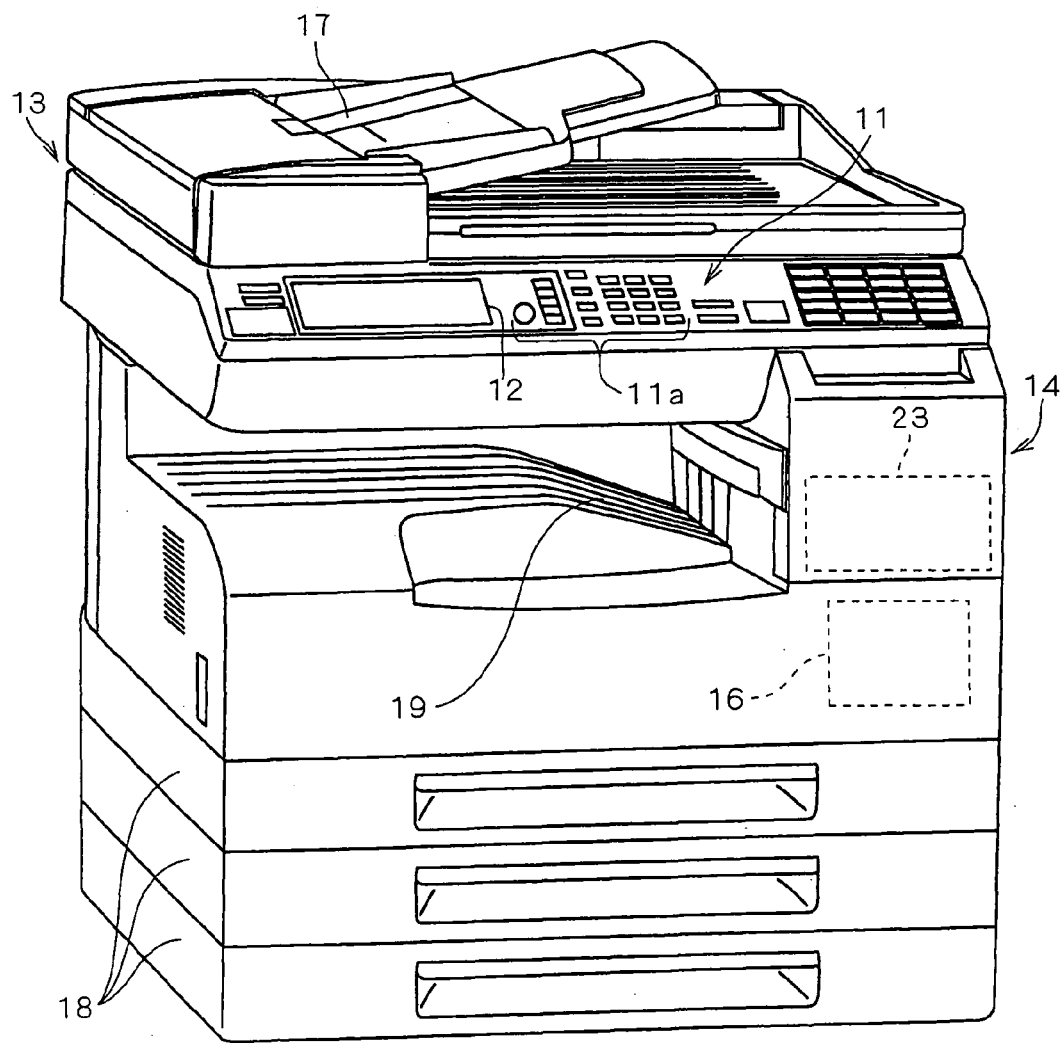
FIG. 2 is a drawing showing the external view of an MFP.

FIG. 2 is a drawing showing the external view of the MFP 10.

The MFP 10 includes multiple keys 11a, as shown in FIG. 2, as well as an operation unit 11 that receives various instructions and input of data comprising letters/characters and numbers via user operation of the keys, a display 12 that displays to the user instruction menus and information regarding obtained images, a scanner 13 that opto-electrically reads an original document and obtains image data, and a printer 14 that prints images on recording sheets based on image data.

The MFP 10 also includes a feeder 17 that is disposed on the top surface of the main unit and feeds each page of an original document to the scanner 13, a paper supply unit 18 that is disposed in the lower part of the MFP 10 and supplies recording sheets to the printer 14, a tray 19 that is disposed in the center of the main unit and on which recording sheets on which images have been printed by the printer 14 are ejected, a communication unit 16 that transmits and receives image data to and from an external device over a network, and a storage unit 23 that stores image data and the like inside the main unit. In addition, the MFP 10 has a network interface that is not shown, and the communication unit 16 is connected to the network via the network interface such that various data can be sent and received between the communication unit 16 and an external device.

The display 12 is used to display various information including authentication display, and the operation unit 11 is used for the input of various information, including selection of various functions. The display 12 comprises a liquid crystal panel that includes a built-in contact sensor and other components that enable it to detect the location touched by the user's finger. Therefore, the operator can input various instructions by pressing the various virtual buttons displayed on the display 12 using his finger, for example. The display 12 has such an operation input function. These operation unit 11 and display 12 function as important user interface elements.

The scanner 13 opto-electrically reads image information comprising a photo, characters/letters or a drawing from the original document and obtains image data. The image data obtained (i.e., density data) is converted into digital data by an image processor not shown, and after subjected to various types of public-domain image processing, the digital data is sent to the printer 14 or the communication unit 16 as image data for printing or transmission, or is saved in the storage unit 23 for later use.

The printer 14 prints images onto recording sheets based on the image data obtained by the scanner 13 or received by the communication unit 16 from an external device, or based on image data stored in the storage unit 23. The printer 14 is a printing unit that performs various types of printing.

The communication unit 16 sends and receives various data over a network such as a LAN or the Internet to and from an external device connected to the network. It also send and receives facsimile data over public telephone circuits.

FIG. 3 is a block diagram showing the components of the MFP 10 that principally pertain to this embodiment. The MFP 10 includes a CPU 20 that performs various types of processing as well as controls the entire MFP 10, and a RAM 21 that stores various data and a ROM 22 that stores prescribed software programs (hereinafter simply 'programs') 221 are connected to the CPU 20. The various functions of the MFP 10 are realized via execution of these programs 221 by the CPU 20. Also connected to the CPU 20 are the operation unit 11, display 12, scanner 13 and storage unit 23, as well as other components. The storage unit 23 comprises a hard disk 231 that stores image data and the like and a card slot 232 that reads information from a memory card 91. the RAM 21 is a nonvolatile memory (i.e., a nonvolatile RAM).

According to this construction, the RAM 21, scanner 13, hard disk 231 and memory card 91 inserted in the card slot 232 can exchange various data via control by the CPU 20, and information stored in the RAM 21, hard disk 231 or memory card 91 is displayed on the display 12 via control by the CPU 20.

Furthermore, the communication unit 16 is also connected to the CPU 20. The communication unit 16 has a network communication unit 161 (see FIG. 3) that exchanges various data with an external device connected to a network such as a LAN or the Internet over the network and a facsimile communication unit 162 (see FIG. 3) that sends and receives facsimile data over public telephone circuits.

The MFP 10 also includes a box (BOX) 30 that stores various data files, as shown in FIG. 1. The BOX 30 is a storage area of the hard disk 231 of the storage unit 23.

The BOX 30 has sub-boxes 31, 32 and 33 into which the BOX 30 is virtually divided. Specifically, the BOX 30 includes as sub-boxes a general user box 31, a secure box 32 and a backup box 33. Because these sub-boxes are also called 'boxes', the MFP 10 includes multiple boxes 31, 32 and 33.

The general user box 31 is a storage area assigned to general users, while the secure box 32 is a storage area having a higher security level than the general user box 31. The backup box 33 is a storage area for automatic backup (described below). Prescribed data files in the general user box 31 are backed up intermittently in the computer 50 in response to an operation by the administrator, but the data files in the backup box 33 are regularly backed up in the computer 50 through automatic operation. However, the present invention is not limited to this implementation, and it is acceptable if the data files in both general user box 31 and backup box 33 are automatically backed up on a regular basis.

The data files are classified into and saved in the boxes 31, 32 or 33.

Three types of print jobs may be executed for a data file stored in the general user box 31. They are, specifically, two types of normal print jobs (a job with backup prohibition designation and a job no such designation) and a secure print job. A secure print job is a print job having a higher security level than a normal print job. A 'secure print (job)' will be described below.

Of the data files that may be executed in any of these types of jobs, data files that may be printed as a normal print job without a backup prohibition designation can undergo the backup routine. On the other hand, of the data files stored in the general user box 31, the data files that are executed as normal print jobs with a backup prohibition designation and the data files that are executed as secure print jobs are deemed prohibited from backup by the user, and are excluded as backup targets. As a result, because the data files that are executed as normal print jobs with a backup prohibition designation are prohibited by the MFP 10 from backup, they cannot undergo the backup routine. Similarly, because the data files executed as secure print jobs are also prohibited from backup by the MFP 10, they also cannot undergo the backup routine.

The data files that are stored in the secure box 32 are treated as normal print jobs. The data files stored in the secure box are deemed prohibited by the user from backup, and are excluded as backup targets. Therefore, because leakage of the information regarding the data files via the computer 50 can be prevented, the security level for the data files in the secure box 32 is higher than that for the data files in the general user box 31 (or to be more precise, the data files stored in the general user box 31 and executed as normal print jobs).

Three types of jobs, i.e., a normal print job, a FAX receipt job and a FAX transmission job, may be executed in connection with a data file stored in the backup box 33. A 'normal print job' is a printing process performed by the MFP 10 in response to an instruction input via the computer 50. A 'FAX receipt job' and a 'FAX transmission job' are, respectively, jobs to receive and transmit data via facsimile communication between the facsimile communication device 80 (see FIG. 1) and the MFP 10. Regardless of which of these types of jobs is to be executed, the data files stored in the backup box 33 undergo the backup routine.

The various operations performed in this system are described in more detail below.

<Operation>

Here, a situation will be described in which (1) a target data file is forwarded from the computer 50 to the MFP 10 in response to an operation on the computer 50, printing is carried out by the MFP 10 with respect to the target data file, and finally the target data file undergoes a routine PA (see FIG. 4) by which it is saved in the storage unit 23 of the MFP 10, following which (2) a backup routine PB (see FIG. 5) is performed for the data file stored in the storage unit 23.

The present invention is not limited to this implementation. It is also acceptable if a backup routine is performed in which the target data file is stored in the MFP 10 while it is subjected to printing by the MFP 10 in response to the operation on the side of the MFP 10, and then the data file stored in the MFP 10 is forwarded to the computer 50. In other words, the processing to store the data file in the MFP 10 may be carried out in response to an operation on the side of the MFP 10.

<Printing Process>

Figure 4:
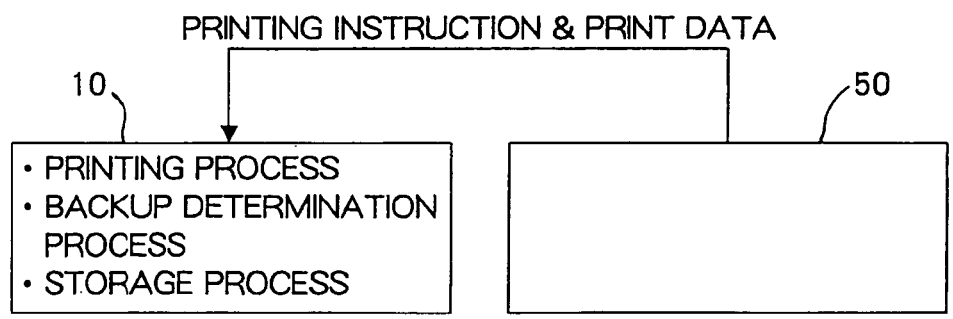
FIG. 4 is a drawing to explain a routine PA.

FIG. 4 is a drawing to explain the routine PA referred to in (1) above. In the routine PA, three processes, i.e., a printing process, a saving process (i.e., storage process) and a backup determination process, are carried out. While the sequence of performance of these three processes may be freely changed, an example will be explained herein in which the processes are performed in the stated sequence.

The operations that take place on the side of the computer 50 during the printing process will first be explained.

When the print execution menu item is selected in the prescribed application program (such as a word processing program) executed on the computer 50, the printer driver is called and processing by the printer driver is carried out.

Figure 6:
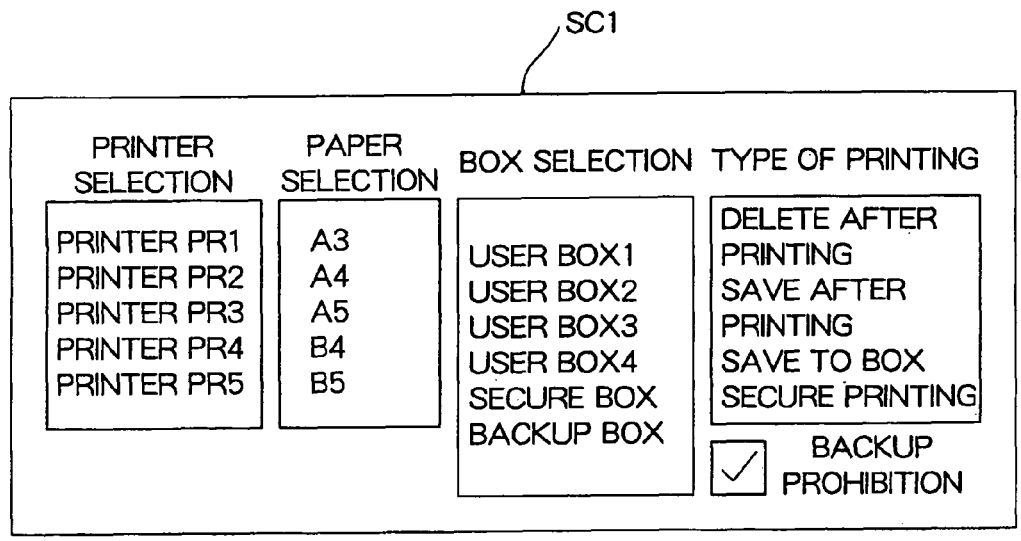
FIG. 6 is a drawing showing a configuration screen SC1 pertaining to the printer driver.

FIG. 6 shows a configuration screen SC1 pertaining to the printer driver. This configuration screen SC1 is displayed on the display unit of the computer 50 in response to the execution of a prescribed operation during the printing process. When the operator of the computer 50 configures various settings using this configuration screen SC1, the MFP 10 determines the setting for each configuration item in accordance with operator entry.

The configuration screen SC1 has multiple configuration items, i.e., specifically, 'printer selection', 'paper selection', 'box selection', 'backup prohibition ON/OFF', and 'type of printing'. The operator can configure the setting for each configuration item by selecting an appropriate option for each configuration item.

'Printer selection' is a configuration item regarding the printing output destination. The operator can designate the printing output destination by selecting a desired printer from among the printers listed under the configuration item description on the configuration screen SC1. While only one MFP 10 is shown in FIG. 1 for the sake of convenience, in this system 1, multiple MFPs 10 and computers 50 may be connected over the network NW. FIG. 6 shows a situation in which multiple MFPs 10 (printers PR1-PR5) are available as the printing output destination options.

'Paper selection' is a configuration item regarding the paper size. The operator can designate the paper size by selecting a desired size from among the paper sizes listed under the configuration item description on the configuration screen SC1.

'Box selection' is a configuration item regarding the storage destination box for the data file that is the target of printing. User boxes for each user as well as the secure box and backup box are displayed under the 'box selection' configuration item description. The operator can designate the box in which the data file should be stored (i.e., the storage destination box) by selecting a desired box from among the boxes listed under the configuration item on the configuration screen SC1. Here, an example is shown in which multiple user boxes are listed and the user designates his own user box. However, the present invention is not limited to this implementation. For example, where user authentication is already completed, the user box for the authenticated user only may be automatically displayed based on the authentication information. In addition, if the IP address, user ID, etc. of the computer 50 itself are automatically used for user authentication, the user is spared having to perform certain data entry operations.

'Backup prohibition ON/OFF' is a configuration item by which backup prohibition for the target data file can be established. The operator can instruct that backup processing should be prohibited for the data file by checking the check box located to the left of the 'backup prohibition' characters in the setting screen SC1. The MFP 10 deems data files designated by the user in this fashion as user-designated backup-prohibited data files, and excludes them as backup targets as described below. Conversely, if the check box is not checked, an instruction to treat the data file as a backup target is deemed to be issued. The operator can permit or prohibit backup for each file through this user operation.

'Type of printing' is a configuration item regarding the type of printing. The operator can designate the type of printing by selecting a desired option from among the options listed under the 'type of printing' configuration item on the configuration screen SC1.

Four options, i.e., 'delete after printing', 'save after printing', 'save to box' and 'secure printing', specifically, are available as the options for 'type of printing'. 'Delete after printing' and 'save after printing' share the common characteristic that the target data file is carried out as normal printing, but differ in the handling of the target data file after normal printing is performed. Namely, 'delete after printing' deletes the data file, while 'save after printing' saves it. 'Save to box' is an option by which to instruct that the target data file be saved in a prescribed box in the MFP 10 without performing the printing process thereto. 'Save to box' shares with 'save after printing' the characteristic that no printing process is performed. 'Secure printing' is an option by which to instruct secure printing, which is a type of printing different from normal printing. 'Secure printing' is described below.

Where an option other than 'delete after printing' is selected from among the four options, the target data file is saved in the MFP 10 and may undergo the backup routine. However, not all data files undergo the backup routine. Specifically, all data files stored in the secure box 32 (see FIG. 1) are determined to be excluded as backup targets (i.e., prohibited from backup). In addition, of the data files stored in the general user box 31 (see FIG. 1), the data files that were printed via secure printing and the data files that were printed via normal printing with backup prohibited are determined to be prohibited from backup. Among the data files stored in the user box, only the data files that underwent normal printing without designation of backup prohibition are determined to be backup targets.

When a start print instruction is issued after settings are made with regard to the configuration items described above, the computer 50 generates a data file for printing and a print instruction command using the printer driver, and sends them to the MFP 10 (see FIG. 4).

When the print instruction command and data file (i.e., print data) are received from the computer 50, the MFP 10 executes a process in accordance with the print instruction command. Specifically, where 'delete after printing' or 'save after printing' is selected as the 'type of printing', a command instructing that normal printing should be executed is included in the print instruction command, and therefore the MFP 10 immediately executes normal printing in response to this command. In more detail, the MFP 10 prints the images on designated paper using the printer 14 and ejects the paper onto which recording has been made onto the tray 19.

Where 'save to box' is selected as the 'type of printing', a command instructing that no printing should be executed is included in the print instruction command, and therefore the MFP 10 does not execute printing in response to this command.

Where 'secure printing' is selected as the 'type of printing', a command instructing that secure printing should be executed is included in the print instruction command, and therefore the MFP 10 executes secure printing in response to this command. Secure printing is a type of printing that ensures receipt of the printed paper by the operator of the computer 50. Accordingly, the MFP 10 does not start printing immediately based on the data file sent from the computer 50, but instead performs standby display on the display 12 of the MFP 10. When the operator of the computer 50 arrives at the location of the MFP 10 and enters a predetermined password by operating the display 12 or other input means of the MFP 10, the MFP 10 begins printing of the data file. As the password, either a password that is determined in advance for each user or a password that is determined for each printing session from the computer 50 may be used.

The storage process (i.e., the saving process) carried out by the MFP 10 will now be explained.

Where an option other than 'delete after printing' (i.e., 'save after printing, 'save to box' or 'secure printing') is selected as the 'type of printing', a command instructing that the received data file should be saved to the designated box is included in the print instruction command, and therefore the MFP 10 saves the data file in response to this command. For example, where the user box BOX 1 is designated as the destination for storage under 'save to box', the data file is saved to the user box BOX 1 without undergoing the printing process. Alternatively, where 'save after printing' in the secure box is designated, the data file is saved to the secure box after undergoing the printing process.

Figure 7:
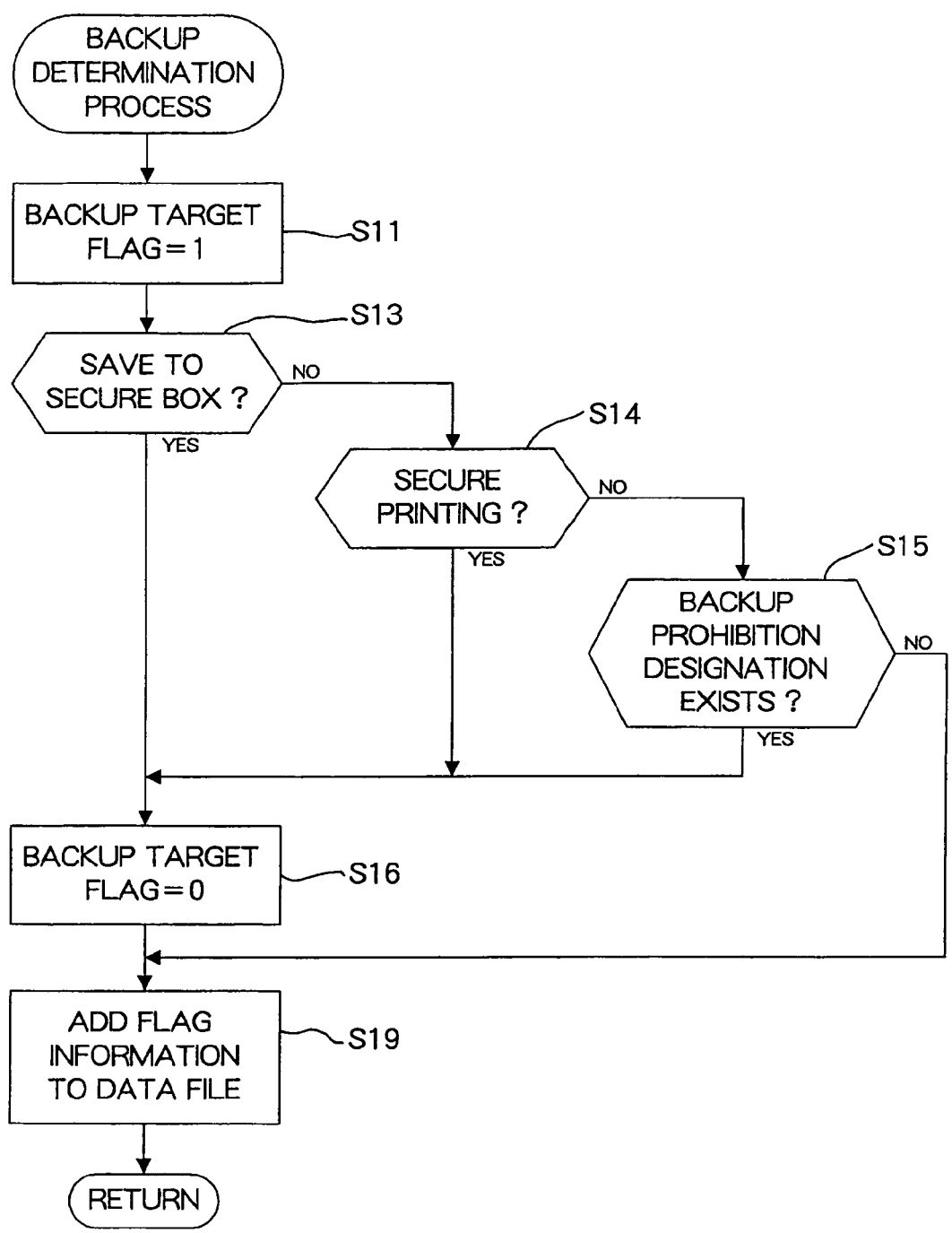
FIG. 7 is a flow chart showing a backup determination process.

The backup determination process carried out in the MFP 10 will now be explained. FIG. 7 is a drawing showing this backup determination process.

As shown in FIG. 7, first, the value of the backup target flag FL regarding the target data file is set to '1' in step S11.

It is then determined whether the target data file is to be saved to the secure box (step S13), undergo secure printing (step S14) or be designated as prohibited from backup (step S15). Where any of these conditions is met, the value of the backup target flag is set to '0' (step S16). In other words, where the target data file is to be saved to the secure box, undergo secure printing or saved with a backup-prohibited designation, the value of the backup target flag FL is set to the value that indicates backup prohibition.

Backup information that includes the value of the backup target flag FL is then added to the data file to be saved (step S19). As a result, the data file is updated as a file that includes the backup information and saved as such.

A situation in which prohibition or permission of backup in connection with printing is determined on the side of the computer 50 was used as an example in this embodiment, but the present invention is not limited to this implementation. For example, it is also acceptable if the configuration with regard to prohibition or permission of backup can be changed in response to the operation of the MFP 10.

Figure 8:
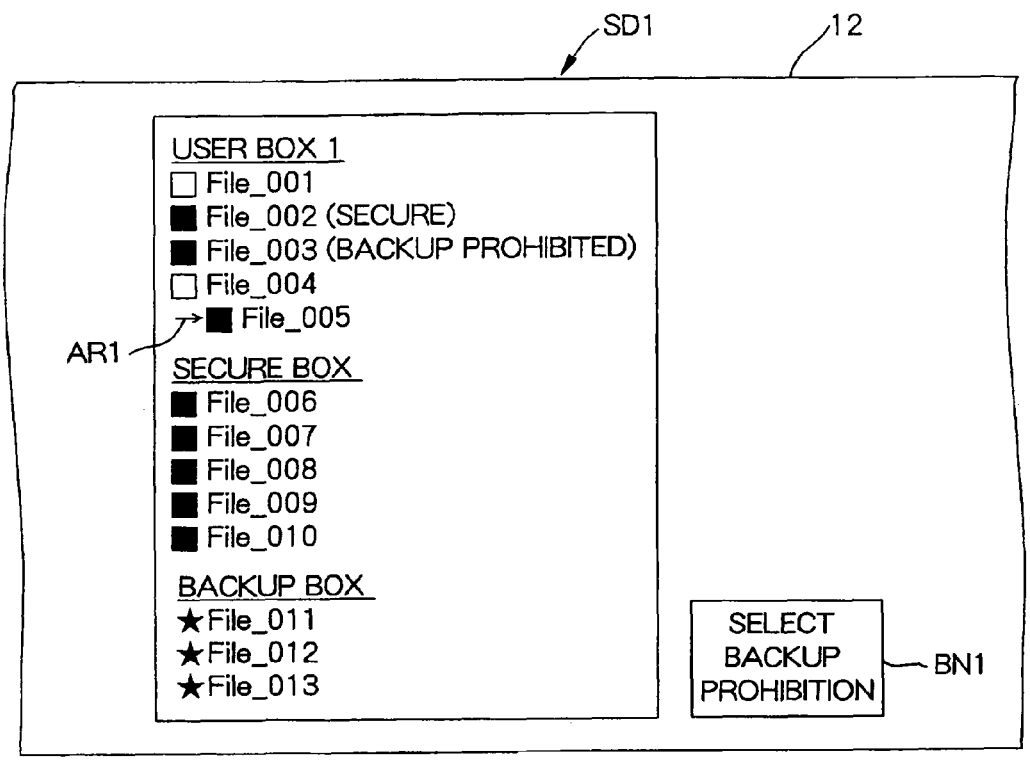
FIG. 8 is a drawing showing a configuration screen SD1 displayed on the MFP.

FIG. 8 is a drawing showing a configuration screen SD1 that is displayed on the display 12 of the MFP 10 in response to a prescribed operation. The operator can change the configuration regarding prohibition or permission of backup using this configuration screen SD1. The file names of the files stored in the user box (BOX 1), secure box and backup box, as well as the configuration status regarding backup prohibition for each file, are shown in FIG. 8.

In the configuration screen SD1, a blank square to the left of the file name of each file indicates that the corresponding file is a data file that may be backed up. A black square to the left of the file name of each file indicates that the corresponding file is a data file that cannot be backed up. Furthermore, a black asterisk indicates that the corresponding file is to undergo automatic backup (described below).

The arrow AR1 indicates the file that is currently selected. Using his finger, the operator presses the area of the display 12 at which the desired file is shown in order to select this file, and presses the button BN 1 to select backup prohibition. In response to this pressing operation, the MFP 10 carries out configuration to prohibit backup of this file. Such prohibition can be cancelled (i.e., backup can be permitted) by pressing the backup prohibition button BN1 once more.

The configuration regarding backup prohibition and permission can be changed through the operation of the MFP 10 as described above.

<Backup Routine>

The backup routine PB described above will now be explained. The backup routine PB is performed after the routine PA, for example.

The backup routine PB is realized via the execution of a backup program on the computer 50 and the exchange of data between the computer 50 and the MFP 10.

Figure 9:
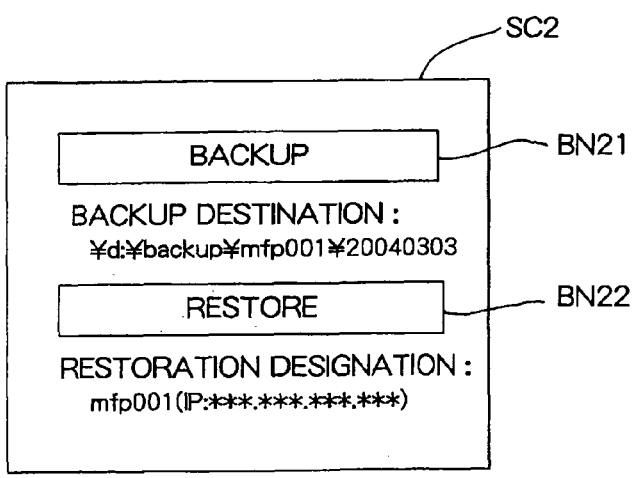
FIG. 9 is a drawing showing a screen SC2 displayed on the display unit of a computer.

FIG. 9 shows a screen SC2 that is displayed on the display of the computer 50 while the backup program is being executed. Data in the MFP 10 can be backed up, i.e., copied and saved to a prescribed directory on the computer 50, through an operation using this screen SC2.

Figure 5:
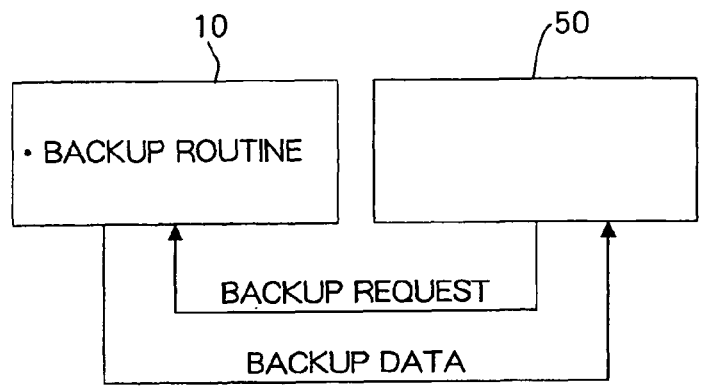
FIG. 5 is a drawing to explain a backup routine PB.

More specifically, when the operator designates a prescribed directory on the computer 50 as the backup destination and presses the backup button BN21, the computer 50 sends a backup request to the MFP 10 (see FIG. 5).

Figure 10:
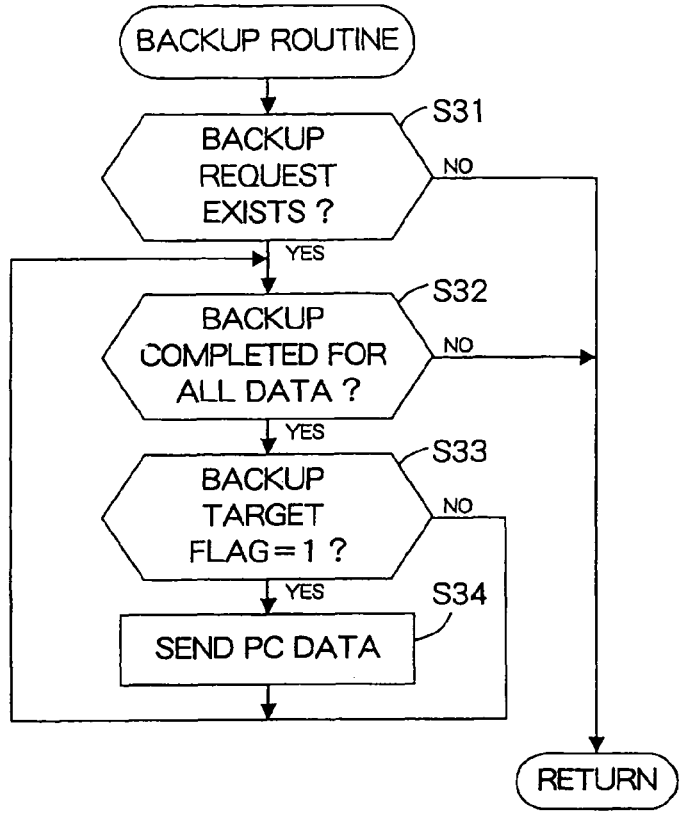
FIG. 10 is a flow chart showing the sequence of operations in the backup routine performed in the MFP.

FIG. 10 is a flow chart showing the sequence of operations for the backup routine performed by the MFP 10. This backup routine is executed over very small intervals by the MFP 10, and the main routine thereof is executed or not executed depending on whether or not a backup request has been received.

Specifically, in step S31, it is determined whether or not a backup request has been received. If it is determined that no such request has been received, the backup routine is ended. On the other hand, if it is determined that a backup request has been received, the operations including and following step S32 (which comprise the main routine) are executed.

Specifically, data files having a backup target flag FL value '1' are selected (step S33) and forwarded to the computer 50 (step S34). When it is determined that these operations are completed for all data files stored in the boxes other than the secure box on the MFP 10 (step S32), this backup routine ends.

Through the backup routine described above, the data files for which no backup prohibition is designated are stored in a prescribed folder on the computer 50. On the other hand, the data files stored in the secure box, the data files subjected to secure printing and the data files saved with backup prohibition designation do not undergo the backup routine and are not saved to the computer 50. These data files can be considered data files designated as backup-prohibited. Backup prohibition can be carried out in this way on the side of the MFP 10.

In the backup routine described above, because the data files designated as backup-prohibited are not forwarded to the computer 50 for backup purposes, they cannot leak to any external parties via the computer 50. Therefore, leakage via the computer 50 of data files designated as backup-prohibited can be prevented.

A routine opposite from the backup routine, i.e., a restoration routine, is performed by writing the data file that was backed up to the computer 50 back to the original data box. Specifically, the start of execution of this routine is instructed by designating a restore destination printer (the MFP 10 here) and pressing the restore button BN 22 on the configuration screen SC2 (see FIG. 9) of the computer 50. In response to this start instruction, the computer 50 forwards the data files stored on the computer 50 to the MFP 10 and saves them therein in their original boxes. As a result, data restoration at the time of apparatus failure or the like can be easily performed. The computer 50 can specify the destination MFP 10 from among multiple MFPs 10 by using an IP address assigned to each MFP 10.

A situation in which the backup routine is executed based on intermittent operation by the operator was described above, but in this embodiment, automatic backup can be periodically performed using the backup program. This automatic backup routine is realized as one of the functions of the backup program executed on the computer 50.

When a request for automatic backup is sent from the computer 50 to the MFP 10, all data files in the backup box 33 (see FIG. 1) become targets of the automatic backup routine. As a result, the various data files stored in the backup box are backed up to the computer 50. Specifically, data files that underwent normal printing and data files that were sent or received via facsimile communication are backed up in the computer 50.

Through this routine, data files for which backup is preferred (such as non-confidential data) can be reliably backed up.

<Other>

Figure 11:
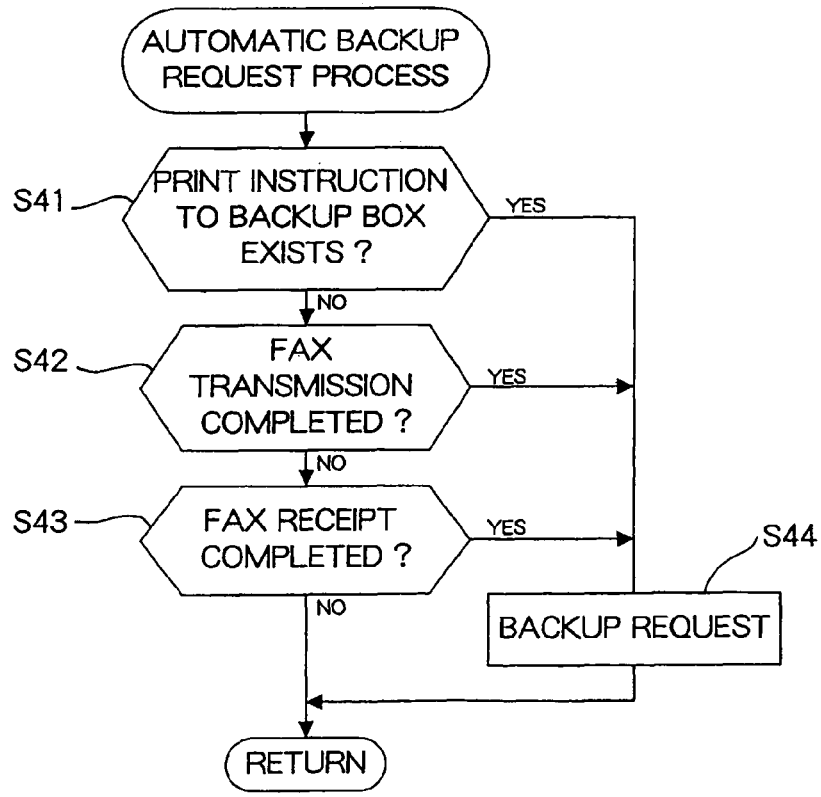
FIG. 11 is a flow chart showing the sequence of operations executed in the MFP during printing or similar processing.

A situation in which the backup routine is carried out in response to a request from the computer 50 was explained as an example in connection with the above embodiment, but the present invention is not limited to this implementation. For example, it is acceptable if a backup request is generated on the side of the MFP 10 when a prescribed operation on the MFP 10 is detected and the target files are automatically forwarded from the MFP 10 to the computer 50 and backed up thereon, as shown in FIG. 11. FIG. 11 is a flow chart showing the sequence of operations of another routine executed in the MFP 10 alongside the various main routines during printing or facsimile communication. With reference to FIG. 11, where it is detected that (i) an instruction has been issued to perform printing and save the data file to the backup box (step S41), (ii) facsimile transmission has been completed (step S42) or (iii) facsimile receipt has been completed (step S43), a backup request is generated (step S44), and the backup routine shown in FIG. 10 is carried out. In this case, only the data files in the backup box undergo the backup routine.

In the embodiment described above and the example shown in FIG. 11, the data files that undergo the backup routine during automatic backup and the data files that undergo the backup routine via administrator operation were saved in different boxes, but it is acceptable if data files in the same box undergo the backup routine for both types of backup operation. For example, it is acceptable if all files in all boxes are selected as backup target candidates during both automatic backup and administrator-initiated backup, and only the data files for which the backup target flag FL is '1' are backed up from among the target candidates.

Furthermore, a situation in which the data files comprising backup targets were changed depending on the type of the storage destination box or type of printing was shown as an example above, but the present invention is not limited to this implementation. For example, data files including a certain identification element (specifically, identification characters, letters, symbols or the like) may be deemed data files that are user-designated as backup-prohibited. More specifically, the MFP 10 may deem data files that include in the file name certain characters, letters, or symbols, such as 'Human Resources' (e.g., 'Human Resources 2002') to be user-designated as backup-prohibited. In this way, the contents of a data file (e.g., whether or not the data file includes confidential information) can be determined based on the file name, and the data file can be excluded as a backup target. In other words, files including such an identification element can be determined to be data files for which backup is inappropriate, permitting such data files to be excluded as backup targets. Conversely, data files that include 'Weekly Bulletin' or the like (e.g., 'Weekly Bulletin for Second Week of July') in the file name may be deemed permitted for backup. As a result, the contents of a data file can be determined based on the file name, and data files for which backup is preferred can be added as backup targets.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A data management apparatus that performs processing to backup image data files in an external storage device that is external to the data management apparatus, the data management apparatus comprising:
   a memory that stores image data files, said memory including a general user box, a secure box and a backup box, wherein the general user box, the secure box, and the backup box are distinct portions of the memory;
   a receiving device that receives from an external device image data files, each of the image data files contains a backup target flag indicating designation by a user for storage of the image data file in one of the general user box, the secure box, or the backup box, and indicating designation by the user as permitting or prohibiting backup of the image data file;
   wherein the memory stores each of the image data files received by the receiving device in one of the general user box, the secure box or the backup box based on the backup target flag contained in the image data file;
   an output device that outputs images based on the image data files; and
   a controller that backs up in the external storage device a portion of the image data files stored in the general user box that is permitted for backup by the user and prohibits backup of those image data files among the image data files stored in the general user box that are designated by the user as prohibited from backup thereby preventing leakage of those image data files designated as prohibited from backup via the external storage device, wherein each image data file stored in the secure box is prohibited from backup, and each image data file stored in the backup box is automatically backed up.

2. The data management apparatus according to claim 1, said apparatus further including a configuration unit that configures a backup prohibition setting for each image data file in response to a user operation.

3. The data management apparatus according to claim 1, wherein image data files having a certain identification element in the file name are deemed designated by the user as prohibited from backup.

4. The data management apparatus according to claim 1, wherein the controller backs up at least some of the image data files stored in the external storage devices.

5. The data management apparatus according to claim 1, said apparatus further including a configuration unit that determines a storage destination box for each image data file in response to a user operation.

6. The data management apparatus according to claim 1, wherein image data files stored in the general user box that are not designated as prohibited from backup are backed up intermittently.

7. A data management apparatus that performs processing to backup image data files in an external storage device that is external to the data management apparatus, comprising:
   a memory that stores image data files, said memory including a general user box, a secure box and a backup box wherein the general user box, the secure box, and the backup box are distinct portions of the memory;
   a receiving device that receives from an external device image data files, each of the image data files contains a backup target flag indicating designation by a user for storage of the image data file in one of the general user box, the secure box, or the backup box, and indicating designation by the user as permitting or prohibiting backup of the image data file;
   wherein the memory stores each of the image data files received by the receiving device in one of the general user box, the secure box or the backup box based on the backup target flag contained in the image data file;
   an output device that outputs images based on the image data files;
   a receiving unit that receives a backup request indicating that the image data files stored in the general user box should be backed up, and
   a controller that, where such backup request is received, backs up a portion of the image data files stored in the general user box and prohibits backup of those image data files among the image data files stored in the general user box that are designated by the user as prohibited from backup, wherein each image data file stored in the secure box is prohibited from backup, and each image data file stored in the backup box is automatically backed up.

8. The data management apparatus according to claim 7, said apparatus further including a configuration unit that configures a backup prohibition setting for each image data file in response to a user operation.

9. The data management apparatus according to claim 7, wherein image data files having a certain identification element in the file name are deemed designated by the user as prohibited from backup.

10. A data management system, comprising:
    a first memory that stores image data files, said memory including a general user box, a secure box and a backup box wherein the general user box, the secure box, and the backup box are distinct portions of the first memory;
    a receiving device that receives from an external device image data files, each of the image data files contains a backup target flag indicating designation by a user for storage of the image data file in one of the general user box, the secure box, or the backup box, and indicating designation by the user as permitting or prohibiting backup of the image data file;
    an output device that outputs images based on the image data files;
    wherein the first memory stores each of the image data files received by the receiving device in one of the general user box, the secure box or the backup box based on the backup target flag contained in the image data file;
    a second memory that stores backup image data files and is included in an external device that is external to the data management system, and
    a controller that prohibits backup in the second memory of those image data files among those image data files stored in the general user box that are designated by the user as prohibited from backup, wherein each image data file stored in the secure box is prohibited from backup, and each image data file stored in the backup box is automatically backed up.

11. The data management system according to claim 10, said system further including a configuration unit that configures a backup prohibition setting for each image file in response to a user operation.

12. The data management system according to claim 10, wherein image data files having a certain identification element in the file name are deemed designated by the user as prohibited from backup.

13. An image forming apparatus that performs processing to backup data files in an external storage device that is external to the data management apparatus, comprising:

a scanner for scanning an image to obtain image data files;
a printer that prints an image based on image data files;
a memory that stores image data files, received from an external device, said memory including a general user box, a secure box, and a backup box, said memory receiving image data files that have been read by the scanner or image data files for printing, each of the image data files contains a backup target flag indicating designation by a user for storage of the image data file in one of the general user box, the secure box, or the backup box, and indicating designation by the user as permitting or prohibiting backup of the image data file,
wherein the general user box, the secure box, and the backup box are distinct portions of the memory, and wherein the memory stores each of the received image data files in one of the general user box, the secure box or the backup box based on the backup target flag contained in the image data file,
a receiving unit that receives a backup request indicating that the image data files stored in the memory should be backed up, and
a controller that, where such backup request is received, backs up in the external storage device a portion of the image data files stored in the general user box that is permitted for backup by the user and prohibits backup of those image data files among the image data files stored in the general user box that are designated by the user as prohibited from backup thereby preventing leakage of those image data files designated as prohibited from backup via the external storage device, wherein each image data file stored in the secure box is prohibited from backup, and each image data file stored in the backup box is automatically backed up.

14. The image forming apparatus according to claim 13, said apparatus further including a configuration unit that configures a backup prohibition setting for each image data file in response to a user operation.

15. The image forming apparatus according to claim 13, wherein the image data files having a certain identification element in the file name are deemed designated by the user as prohibited from backup.

16. A data management apparatus, comprising:
a memory in the data management unit that stores image data files, said memory including a general user box, a secure box and a backup box wherein the general user box, the secure box, and the backup box are distinct portions of the memory;
a receiving device that receives from an external device image data files, each of the image data files contains a backup target flag indicating designation by a user for storage of the image data file in one of the general user box, the secure box, or the backup box, and indicating designation by the user as permitting or prohibiting backup of the image data file;
wherein the memory stores each of the image data files received by the receiving device in one of the general user box, the secure box or the backup box based on the backup target flag contained in the image data file;
an output device that outputs images based on the image data files;
a processing unit in the data management apparatus for performing processing to back up image data files that are stored in the memory into an external storage device that is external to the data management apparatus, and
a controller in the data management apparatus that prohibits backup of a portion of the image data files among the image data files stored in the general user box that are designated by a user as prohibited from backup, wherein each image data file stored in the secure box is prohibited from backup, and each image data file stored in the backup box is automatically backed up.

17. The data management apparatus according to claim 16, further including a configuration unit that configures a backup prohibition setting for each image data file in response to a user operation.

18. The data management apparatus according to claim 16, further including a configuration unit that configures a backup prohibition setting for each image data file in response to a user operation.

* * * * *